US00RE34521E

United States Patent [19]

Shimizu et al.

[11] E Patent Number: Re. 34,521

[45] Reissued Date of Patent: Jan. 25, 1994

[54] THERMAL TRANSFER RECORDING APPARATUS WITH INK PAPER CASSETTE

[75] Inventors: Hiroshi Shimizu; Naohiro Ozawa, both of Yokohama; Toshihiko Gotoh, Tokyo; Kentaro Hamma, Yokohama, all of Japan

[73] Assignee: Hitachi, Ltd., Tokyo, Japan

[21] Appl. No.: 865,022

[22] Filed: Apr. 7, 1992

Related U.S. Patent Documents

Reissue of:

[64] Patent No.: 4,915,516
Issued: Apr. 10, 1990
Appl. No.: 222,428
Filed: Jul. 21, 1988

[30] Foreign Application Priority Data

Jul. 24, 1987 [JP] Japan ..... 62-183283

[51] Int. Cl.[5] ..... B41J 3/02

[52] U.S. Cl. ..... 400/120; 400/208; 400/703

[58] Field of Search ..... 400/120, 207, 208, 241, 400/703, 225, 54, 196, 692

[56] References Cited

U.S. PATENT DOCUMENTS

| | | | |
|---|---|---|---|
| 3,643,778 | 2/1972 | Anderson | 400/693.1 |
| 4,160,605 | 7/1979 | Neubaum | 400/208 |
| 4,264,223 | 4/1981 | Bemis et al. | 400/208 |
| 4,265,552 | 5/1981 | Bemis et al. | 400/208 |
| 4,359,288 | 11/1982 | Bullock | 400/208 |
| 4,397,575 | 8/1983 | Aldrich | 400/208 |
| 4,673,304 | 6/1987 | Liu et al. | 400/120 |
| 4,676,078 | 6/1987 | Watanabe | 400/120 |
| 4,725,157 | 2/1988 | Nakai et al. | 400/680 |

FOREIGN PATENT DOCUMENTS

| | | | |
|---|---|---|---|
| 67278 | 6/1981 | Japan | 400/208 |
| 220783 | 12/1983 | Japan | 400/225 |
| 28679 | 4/1986 | Japan | 400/225 |
| 274978 | 12/1986 | Japan | 400/225 |
| 39270 | 2/1987 | Japan | 400/225 |
| 172778 | 8/1988 | Japan | 400/225 |

*Primary Examiner*—Eugene H. Eickholt
*Attorney, Agent, or Firm*—Antonelli, Terry, Stout & Kraus

[57] ABSTRACT

An ink paper cassette has ink paper, a supply shaft for supplying the ink paper, a take-up shaft for winding the ink paper, a front connecting portion for rotatably supporting first ends of the supply and the take-up shafts and a rear connecting portion for rotatably supporting second ends of the supply and the take-up shafts. The ink paper cassette is to be loaded into a printer. The printer performs thermal prints of characters and/or pictorial images onto a transfer paper with the ink paper loaded in the ink paper cassette. The front connecting portion has a depth so greater than that of the rear connecting portion that the front connecting portion is brought into abutment with a front face of a printer mechanism, whereby preventing the ink paper cassette from being loaded into the printer.

13 Claims, 14 Drawing Sheets

| CASSETTE | STANDARD | NON-STANDARD | NO CASSETTE |
|---|---|---|---|
| HOLE | NONE | YES | (YES) |
| SWITCH 18 | ○ | × | × |
| SWITCH 25 | ○ | ○ | × |

FIG. 7A
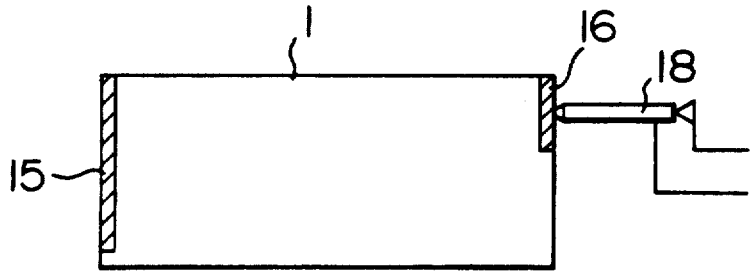
FIG. 7B
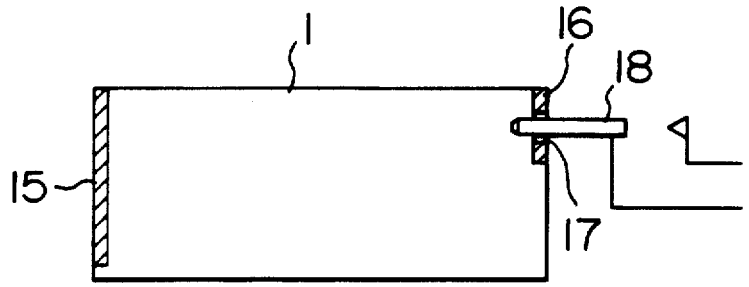
FIG. 7C
| CASSETTE | STANDARD | NON-STANDARD | NO CASSETTE |
|---|---|---|---|
| HOLE | NONE | YES | (YES) |
| ORDINARY PRINTER | ○ | × | × |
| HIGH CLASS PRINTER | ○ | ○ | × |

FIG. 8A
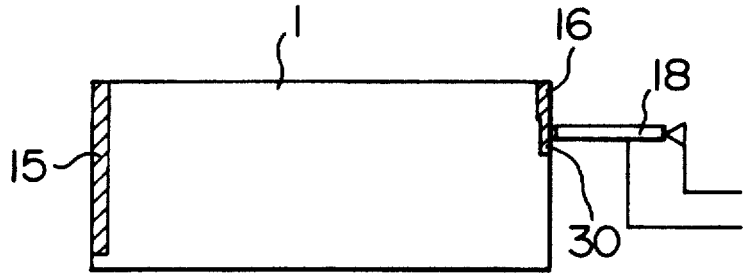
FIG. 8B
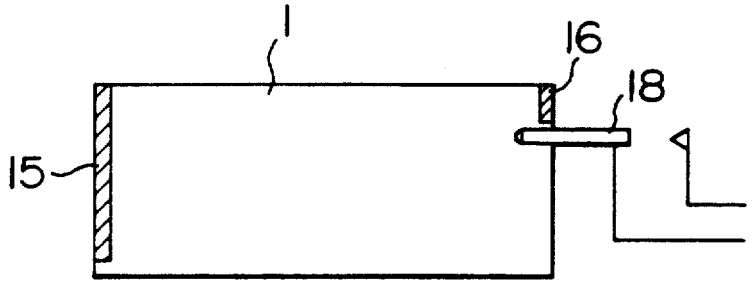
FIG. 8C
| CASSETTE | STANDARD | NON-STANDARD | NO CASSETTE |
|---|---|---|---|
| PROJECTION | YES | NONE | (NONE) |
| ORDINARY PRINTER | ○ | × | × |
| HIGH CLASS PRINTER | ○ | ○ | × |

FIG. 9A
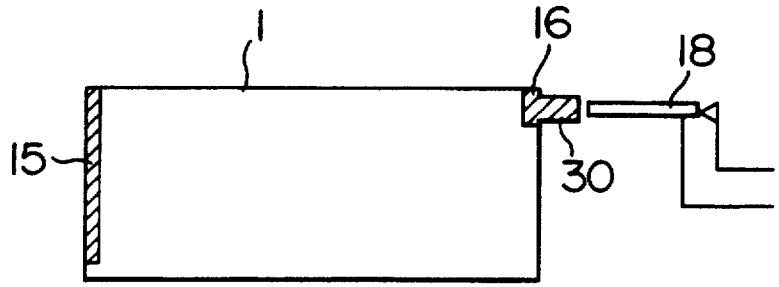
FIG. 9B
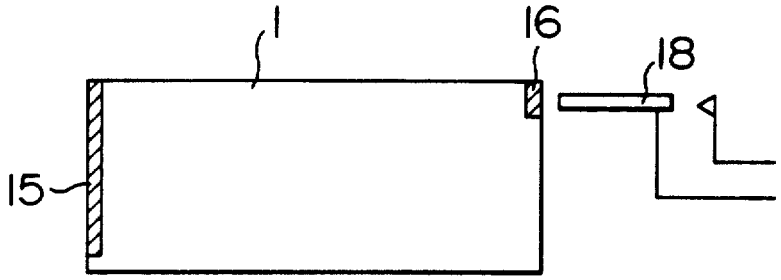
FIG. 9C
| CASSETTE | STANDARD | NON-STANDARD | NO CASSETTE |
|---|---|---|---|
| PROJECTION | YES | NONE | (NONE) |
| ORDINARY PRINTER | ○ | × | × |
| HIGH CLASS PRINTER | ○ | ○ | × |

FIG. 16

| | STANDARD CASSETTE A | STANDARD CASSETTE B | NON-STANDARD CASSETTE C | NO CASSETTE |
|---|---|---|---|---|
| NUMBER OF HOLES | 0 | 1 | 1 | 2 |
| SWITCH 18 | ○ | ○ | × | × |
| SWITCH 25 | ○ | × | ○ | × |
| ORDINARY PRINTER | ○ | ○ | × | × |
| HIGH CLASS PRINTER | ○ | ○ | ○ | × |

THERMAL TRANSFER RECORDING APPARATUS WITH INK PAPER CASSETTE

Matter enclosed in heavy brackets [ ] appears in the original patent but forms no part of this reissue specification; matter printed in italics indicates the additions made by reissue.

BACKGROUND OF THE INVENTION

The present invention relates to a thermal transfer recording apparatus with a cartridge or cassette incorporating strip medium such as ink paper.

A method for loading ink paper onto a printer in which characters or images are to be printed with an ink applied paper has been well known in, for example, various printers or typewriters. In particular, a method for readily loading a wide ink paper onto a printer is known in JP-A-56/67278 in which a supply shaft for supplying the ink paper and a take-up shaft for winding up the ink paper are mounted on the cassette. During the printing operation, a pressure roller for superposing printing paper and the ink paper is connected to the supply shaft and take-up shaft within the cassette by a rotary connection means, thereby performing the feed of ink paper in response to the printing operation.

In accordance with the above-described prior art technique, if the cassette is inversely inserted into the thermal transfer recording apparatus, the cassette is inserted deeply into the apparatus so that a normal printing operation would not result. Also, if a cassette contains the particular ink paper such as super high sensitive ink paper that cannot be usually used in the ordinary thermal transfer recording apparatus, an improper printing would be carried out with an improper ink, resulting in an printing failure or a breakdown of the thermal transfer printing apparatus.

SUMMARY OF THE INVENTION

Accordingly, an object of the present invention is to provide a thermal transfer recording apparatus in which a failure or malfunction caused by an reverse or backward loading of the cassette into the apparatus or by using improper ink paper is prevented.

To this end, according to the present invention, a depth of a connecting portion for connecting two shafts of the cassette on the front side in a cassette insertion direction (hereinafter referred to as "front face") is greater than that on the rear side in the cassette insertion direction (hereinafter referred to as "rear face") so that the front face connecting portion abuts a part of the thermal transfer recording apparatus.

With such a structure, if the cassette is normally inserted into the thermal transfer recording apparatus by the user, the cassette may be smoothly inserted into the recording apparatus without any hindrance. However, if the cassette is to be inserted backward into the recording apparatus by the user, the front face connecting portion of the cassette having a greater depth will abut a part of the thermal transfer recording apparatus, whereby the insertion of the cassette is prevented at a cassette inlet of the recording apparatus. Thus, the erroneous insertion of the cassette may be avoided without fail.

Also, according to the present invention, a cassette within which a special ink paper is loaded is provided with a hole or a projection, and a detector for detecting such hole or projection is provided within the recording apparatus.

Thus, a cassette within which the special ink paper is loaded is different in structure from a normal cassette within which the normal ink paper is loaded. The detector may detect this difference, whereby malfunctioning of the recording apparatus may be prevented.

BRIEF DESCRIPTION OF THE DRAWINGS

In the accompanying drawings:

FIGS. 7A and 7B are illustrations of a hole, for indicating a kind of an ink paper, formed in the cassette according to another embodiment;

FIG. 7C is a chart showing the operation of the cassette of FIGS. 7A and 7B;

FIGS. 8A and 8B are illustrations of a discriminating portion formed in a cassette according to still another embodiment;

FIG. 8C is a chart showing the operation of the cassette of FIGS. 8A and 8B;

FIGS. 9A and 9B are illustrations of a discriminating portion formed in a cassette according to still another embodiment;

FIG. 9C is a chart showing the operation of the cassette of FIGS. 9A and 9B;

FIG. 16 is a chart for the detecting operation in case of two kinds of ink paper indicating holes.

DESCRIPTION OF PREFERRED EMBODIMENTS

Figure 1:
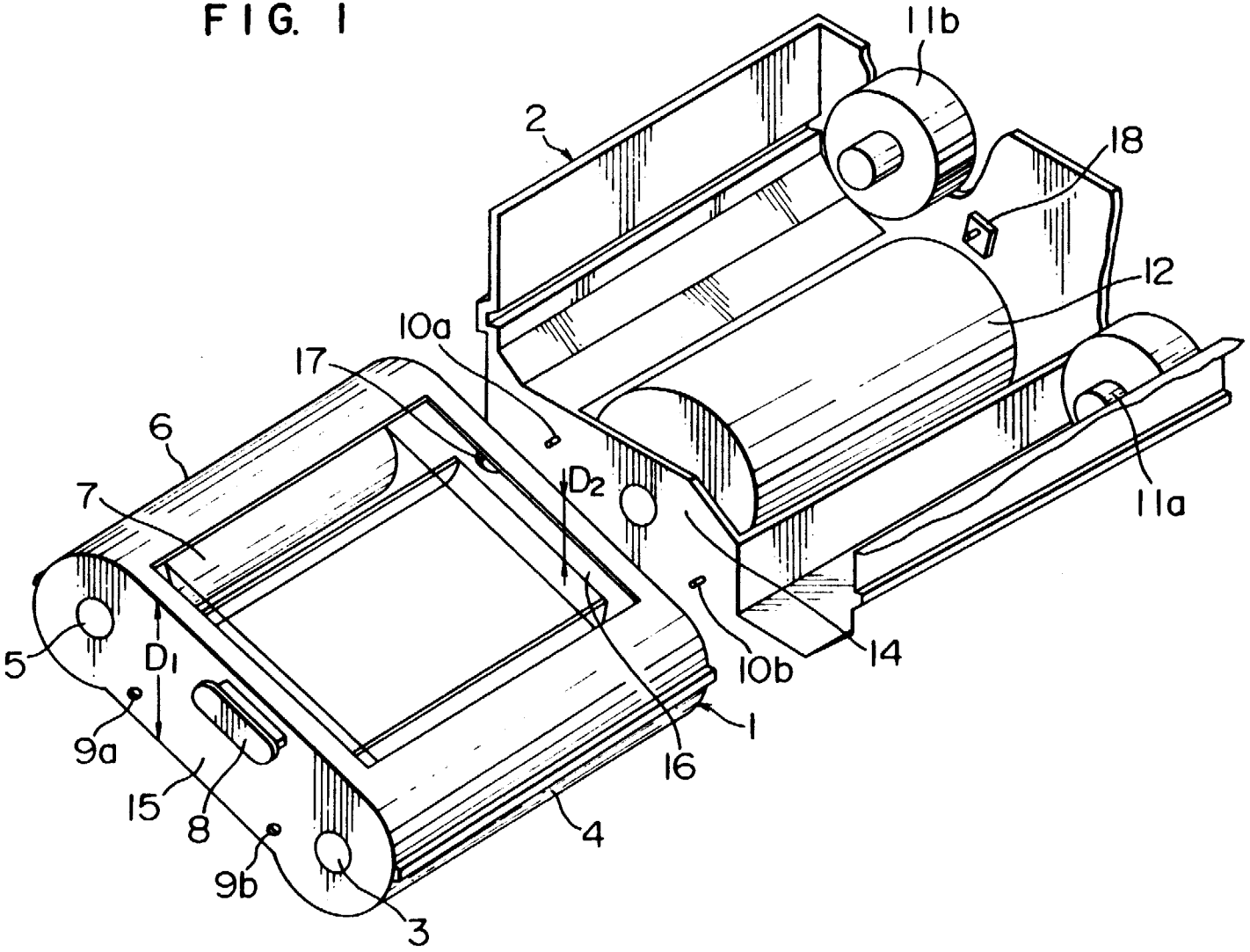
FIG. 1 is a schematic view showing a thermal transfer recording apparatus in accordance with one embodiment of the invention.
Figure 2:
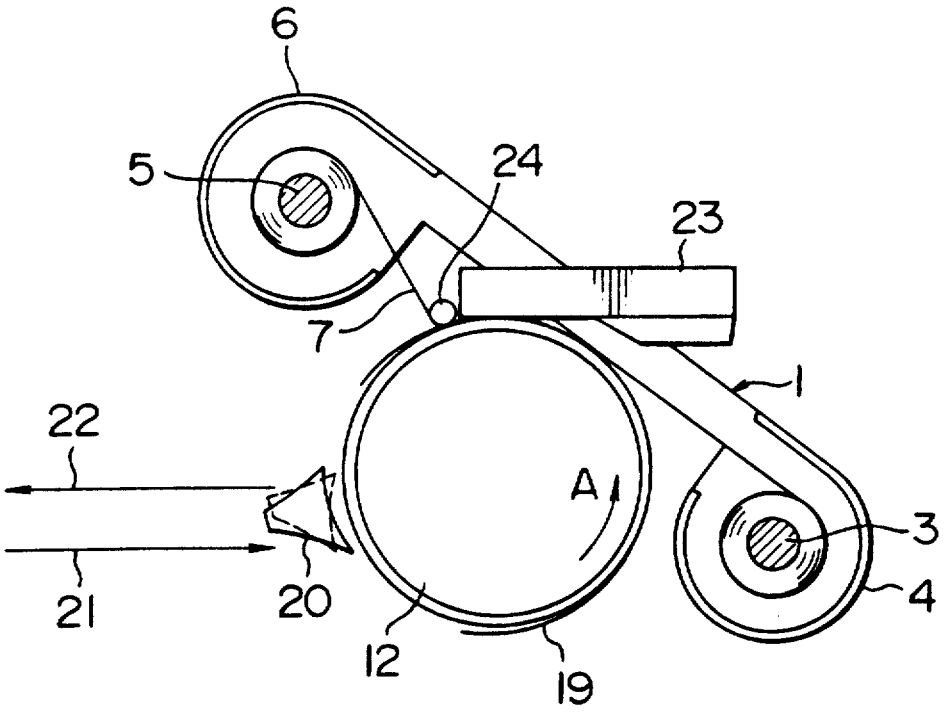
FIG. 2 is a side elevational view showing the operation of the thermal transfer recording apparatus shown in FIG. 1.

Referring to FIG. 1, a cassette 1 includes therein a supply shaft 3 for supplying new ink paper and a take-up shaft 5 for winding up the used ink paper. Ink paper 7 is laid between the shafts 3 and 5. The two shafts 3 and 5 are received in supply shaft housing portion 4 and a take-up shaft housing portion 6, respectively. The two shaft housing portions 4 and 6 are supported by a front face connecting portion 15 and a rear face connecting portion 16. The front face connecting portion 15 is provided with a grip 8 for holding by a person using the cassette and with positionship holes 9a and 9b. A depth $D_1$ of the front face connecting portion 15 is greater than that $D_2$ of the rear face connecting portion 16. The depth $D_1$ is determined so that the front face connecting portion 15 abuts a front face 14 of a printer mechanism 2 when the cassette is inserted backwards. Also, a hole 17 for indicating a special kind of ink paper in the cassette is formed on the rear face connecting portion 16 of a cassette within which special ink paper is loaded. This indicating hole 17 is not formed in a standard cassette within which standard ink paper is loaded. A loading detection switch 18 is located in a part of the printer mechanism 2 corresponding to the hole 17. When the cassette 1 is inserted into the printer mechanism 2, the loading detection switch 18 is depressed, thereby detecting the insertion of the cassette 1 into the printer mechanism 2. Within the printer mechanism 2, there is provided a drum 12 around which a transfer paper (not shown) is wound and delivered the ink on the ink paper is to be transferred on the transfer paper. The cassette 1 is located on the drum 12 (FIG. 2). The operation of the thermal transfer recording apparatus will be described later.

When the cassette 1 is loaded in the printer mechanism 2, torque transmission shafts 11a and 11b of the printer mechanism 2 are engaged with bearing portions (FIG. 5) of the shafts 3 and 5, respectively, in the cassette 1, so that rotational torque is transmitted from the printer mechanism 2 to the take-up shaft 5 and the supply shaft 3. Also, positioning pins 10a and 10b of the printer mechanism 2 are inserted into the positioning holes 9a and 9b, thereby performing the alignment of the cassette 1 in the printer mechanism 2. In case of the special cassette 1, having the indicating hole 17 on the rear face connecting portion 16, in which the special ink paper is loaded, since the loading detection switch 18 is not depressed even though the cassette has been inserted, the thermal transfer recording apparatus does not recognise where the cassette 1 is loaded. Therefore, the printing operation is not performed. Thus, it is possible to avoid a misprint with the special ink paper.

FIG. 2 shows a basic mechanism of the thermal transfer recording apparatus. A sheet of transfer paper 19 supplied from a supply path 21 is wound around the drum 12 and is fed in accordance with the rotation of the drum 12 in the direction indicated by an arrow A. The transfer paper 19 is superposed with the ink paper 7 and depressed by a thermal head 23. The thermal head 23 has in a lower portion thereof five hundred and twelve thermal elements arranged in a row in an axial direction of the drum 12. Each of the elements generates heat independently. The heat generated by the thermal head 23 is transferred to the ink paper 7 so that ink on the ink paper 7 will be gasified or melted by such heat, as a result of which the ink is transferred to the transfer paper 19 with a density corresponding to the quantity of the heat generated in the thermal head 23. Each time the above-described operation is carried out, the drum 12 is rotated gradually in the direction A. The operation is carried out by six hundred and forty times (six hundred and forty image elements) at a constant interval. The ink paper 7 and the transfer paper 19 are separated from each other by a peeling roller 24 behind the thermal head 23. The ink paper 7 is wound around the take-up shaft 5. The transfer paper 19 on the drum 12 continues moving, since a paper feed/discharge switching member 20 is switched in a position indicated by the solid line. Accordingly an image having 512×640 image elements and different densities is recorded on the transfer paper 19. Three colours of ink, Cy, Mg and Ye have been applied, in advance, on the ink paper 7 over a single picture section of the transfer paper 19. Therefore, the pint of 512×640 image elements according to the above-described recording operation is carried out three times for different colours so as to perform a color image printing. The paper feed/-discharge switching member 20 is switched to a position indicated by the dotted line after the three time (three color) recording. The paper feed/discharge discharge switching member 20 removes the transfer paper 19 on which the recording has been finished from the drum 12. The transfer paper 19 is fed to a discharge path 22 and is discharged to the outside of the thermal transfer recording apparatus.

Figure 3A:
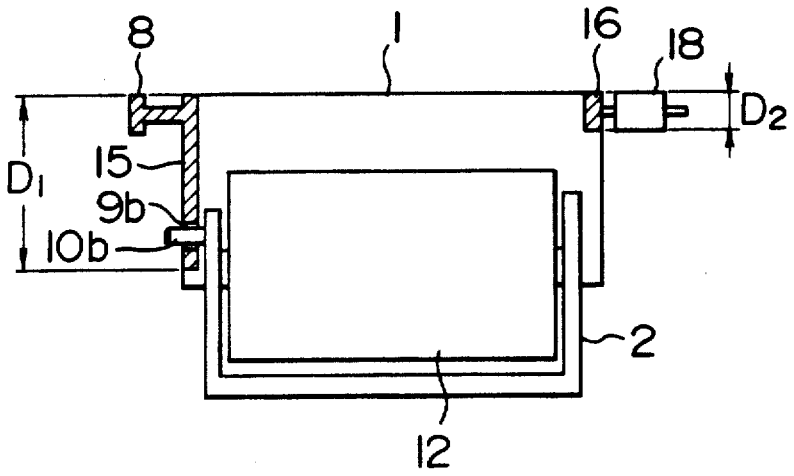
FIGS. 3A and 3B are schematic views showing a mechanism for preventing the inverse insertion of the cassette in accordance with the embodiment.
Figure 3B:
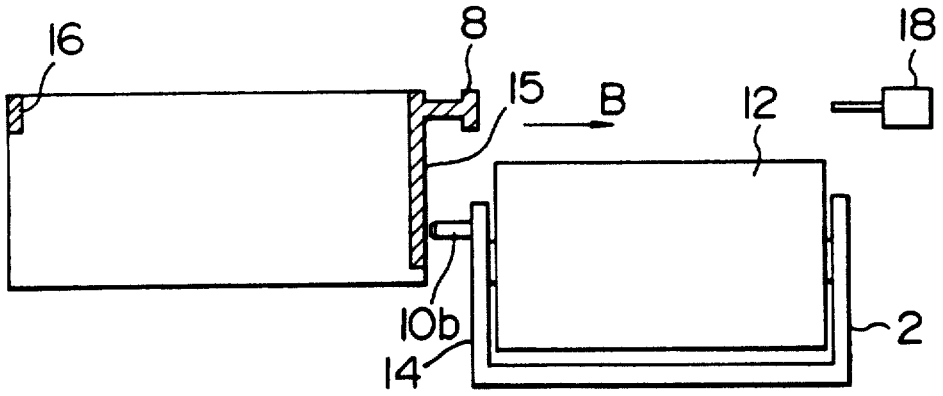

FIGS. 3A and 3B schematically illustrate the prevention of the cassette reverse or backwards insertion due to the difference in depth of the front face connecting portion 15 and the rear face connecting portion 16 of the cassette 1. FIG. 3A is a schematic view showing the state in which the cassette 1 is loaded in the correct way. The cassette 1 is inserted deeply into the mechanism 2 so that the rear face connecting portion 16 depresses the switch 18. Thus, the recording apparatus detects the state where the cassette 1 is loaded therein. Also, the positioning pin 10a and 10b of the mechanism 2 are inserted into the positioning holes 9a and 9b of the front face connecting portion 15, so that the cassette 1 is fixed in a predetermined position within the printer mechanism 2. FIG. 3B is a view showing the state in which the cassette 1 is being inserted into the printer mechanism 2 in the backwards or reverse direction (indicated by the arrow B). In this case, the front connecting portion 15, having a greater depth, of the cassette 1 is brought into contact with the positioning pin 10b or the front face of the mechanism 2, thus preventing the insertion of the cassette 1. Since the insertion of the cassette 1 is prevented at the inlet portion of the printer mechanism 2, the user may readily recognize that it is impossible to insert the cassette into the apparatus. Therefore, there is no fear that the user would forcibly insert the cassette 1. Also, if the front face connecting portion 15 and the rear face connecting portion 16 of the cassette 1 are rather different from each other in shape so that the shaft of the cassette is asymmetric with respect to the fore-and-aft direction, it is further easier for the user to distinguish the front and rear of the cassette.

Figure 4A:
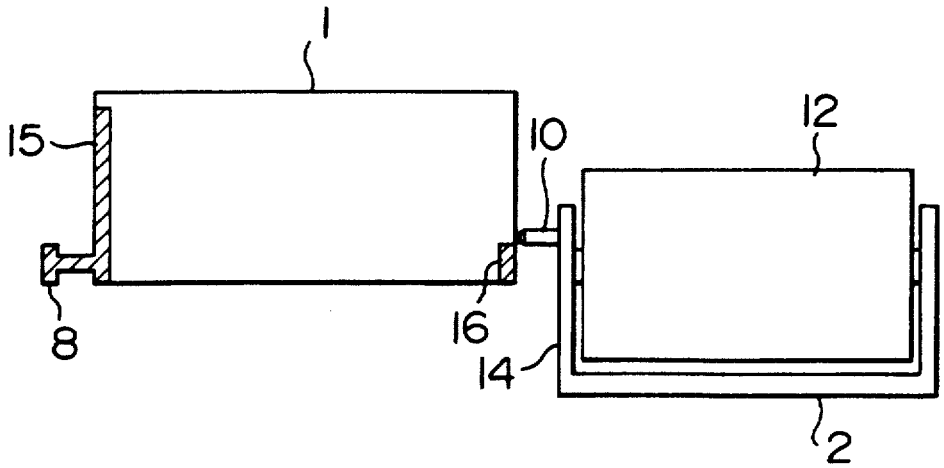
FIGS. 4A to 4C are schematic views showing a mechanism for preventing the erroneous insertion of the cassette in accordance with another embodiment.
Figure 4B:
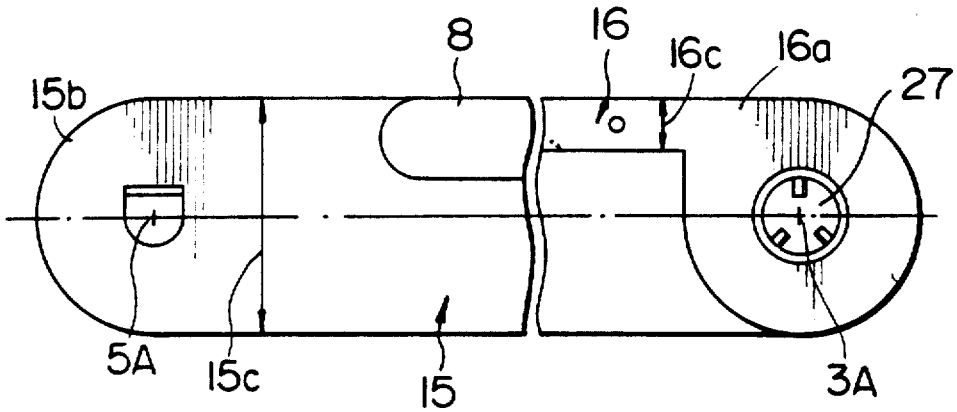
Figure 4C:
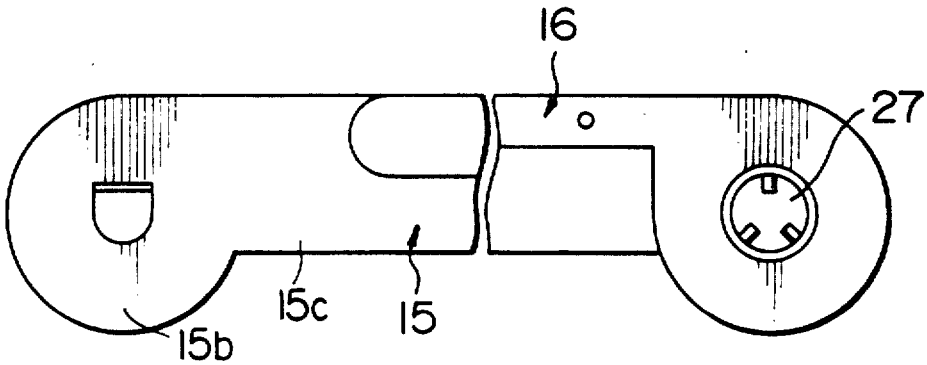

FIG. 4A is a view showing the state in which the cassette 1 is being inserted upside down into the thermal transfer recording apparatus by the user. The rear face connecting portion 16 is positioned at a lower part in the drawings since the cassette is held upside down. Thus, the rear face connecting portion 16 is brought into contact with the front surface 14 of the mechanism part or the positioning pins 10a and 10b so that the cassette 1 is prevented from being inserted into the thermal transfer recording apparatus. FIG. 4B shows an example of shapes of the connecting portions 15 and 16. The left half of the drawings is a front view of the cassette 1, whereas the right half is a rear view of the cassette 1. Since the cassette has an asymmetric face connecting portion 16, it is easy for he user to recognize the top side and the bottom side of the cassette. The rear face connecting portion 16 has two end portions 16a, 16b, (only one is shown) and an interconnecting portion 16c. The portion 16c is disposed with respect to a line extending through the axes 5A, 3A of the respective take-up shaft 5 and supply shaft 3. The cassette 1 is so constructed that the depth of the front face connecting portions 15 is greater than that of the rear face connecting portion 16. FIG. 4C shows still another example of the cassette 1. In the same manner as in FIG. 4B, the left half of FIG. 4C is a front view of the cassette, and the right half of FIG. 4C is a rear view of the cassette. The front face connecting portion 15 has two end portions 15a, 15b (only one is shown) and an interconnecting portion 15c. The portion 15c is disposed with respect to a line extending through the axes 5A, 3A of the respective take-up shaft 5 and the supply shaft 3. Also in the cassette shown in FIG. 4C, the vertical depth of the front face connecting portion 15 is greater than that of the rear face connecting portion 16. However, the vertical depth of the front connecting portion 15 is lesser than the depth of the front connecting portion 15 of the cassette shown in FIG. 4B. Since the cassette shown in FIG. 4C has the asymmetic front face connecting portion 15 with respect to the vertical direction, it is easy for the user to recognize the top side and bottom side of the cassette.

Figure 5:
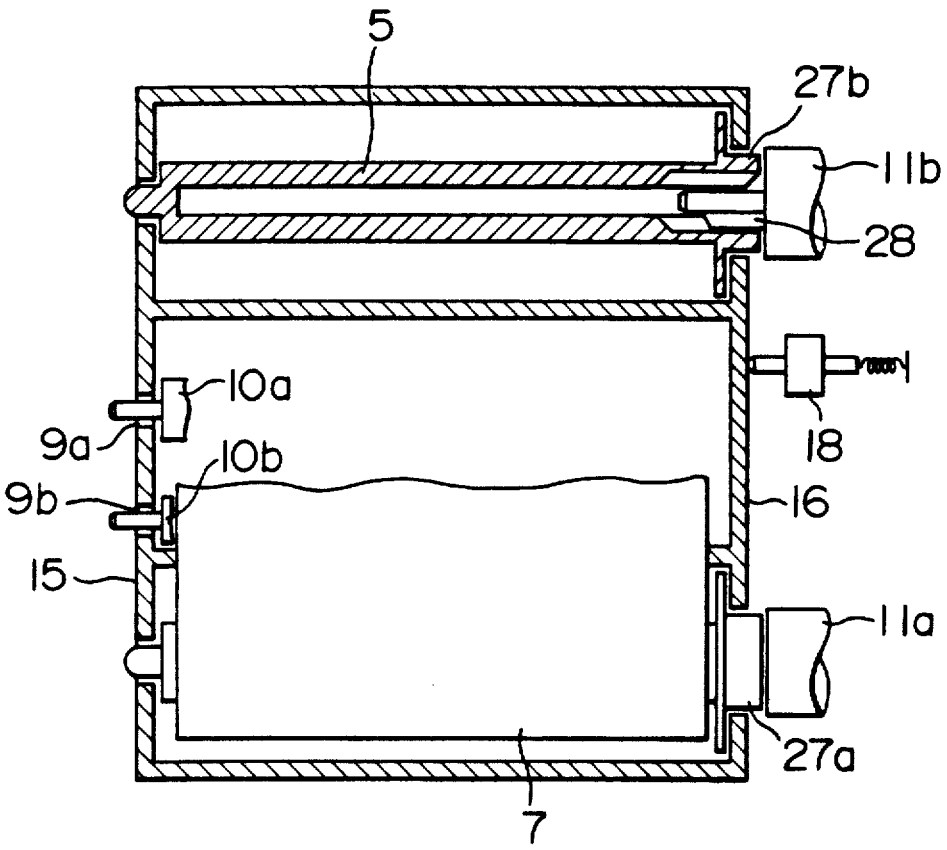
FIG. 5 is a view showing an engagement of the cassette and the printer.

FIG. 5 is a schematic plan view of the printer mechanism 2 in which the cassette 1 is loaded. As described in conjunction with FIG. 1, the torque transmission shafts 11a and 11b of the printer mechanism 2 are engaged with the bearing portions 27a and 27b of the cassette 1 so that the rotational torque is transmitted to the take-up shaft 5 through a torque transmission claw 28. The positioning pins 10a and 10b of the printer mechanism 2 are inserted into the positioning holes 9a and 9b formed in the cassette 1 so that the cassette 1 is fixed in place. Also, the rear face connecting portion 16 of the cassette 1 depresses the detection switch 18 of the printer mechanism 2, whereby the thermal transfer recording apparatus detects the insertion of the cassette 1.

Figures 6A, 6B:
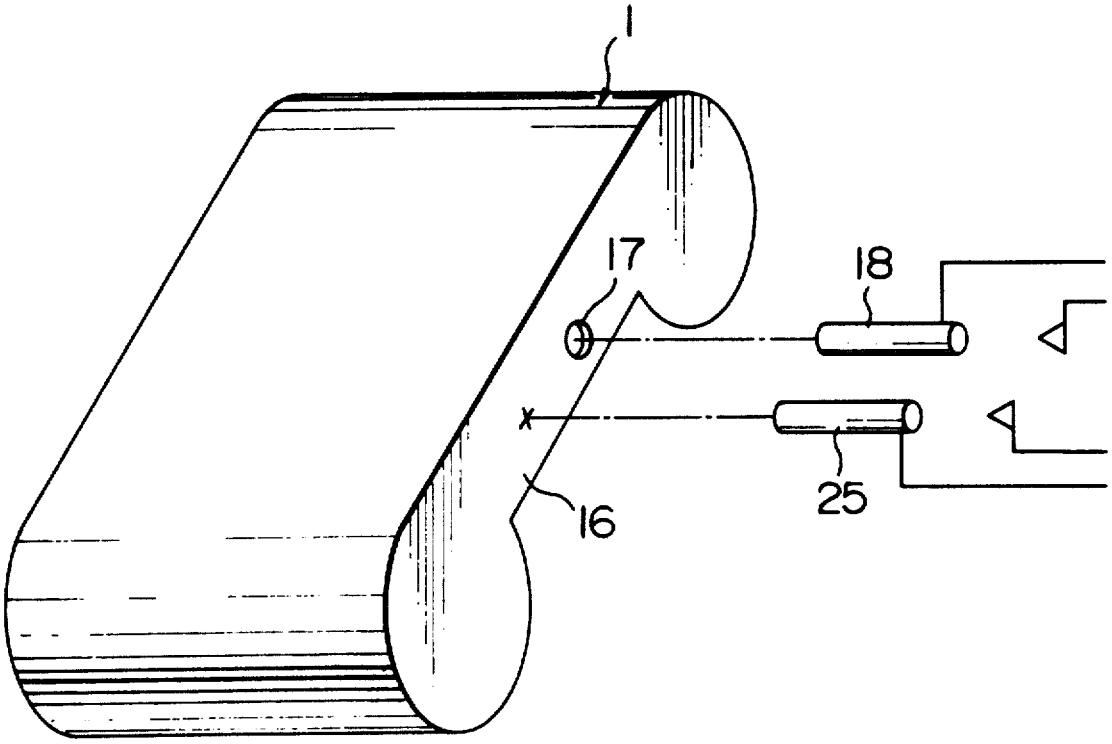
FIG. 6A is an illustration of a hole, for indicating a kind of ink paper, formed in the cassette according to the embodiment.
FIG. 6B is a chart showing the operation of the cassette of FIG. 6A.

FIGS. 6A and 6B illustrate a concept of a discriminating system for discriminating between the cassette in which the special ink paper is loaded and the cassette in which the regular or standard ink paper is loaded. The indicating hole 17 is not formed in the cassette in which the standard ink paper is loaded, whereas the indicating hole 17 is formed in the cassette in which the special ink paper is loaded. Referring to FIG. 6A, switches 18 and 25 are provided in the printer mechanism 2. FIG. 6B shows the states of the switches 18 and 25 in accordance with the kind of the cassette in the embodiment shown in FIG. 6A. In FIG. 6B, a sign o represents the state where the switch is depressed or turned on, whereas a sign x represents the state where the switch is not depressed. The switch 18 is depressed only in the case where the cassette having the standard ink paper is loaded in the printer mechanism 2. The switch 25 is depressed in the case where the cassette is set in the printer mechanism irrespective of the kind of the loaded ink paper. In other words, in the case where the cassette in which the stand ink paper is loaded is set in the printer mechanism, the switch 25 is depressed by the cassette, and since there is no indicating hole 17 is the cassette, the switch 18 is also depressed by the cassette. In the case where the cassette in which the special ink paper is loaded is set in the printer mechanism, the switch 25 is depressed, and since the indicating hole 17 is formed in the cassette, the switch 18 is not depressed. In the case where no cassette is loaded in the printer mechanism, neither switch 18 nor 25 is depressed. In the case where the printer is so constructed that the regular ink paper cassette is usable exclusively, it is sufficient to provide the switch 18 in the printer mechanism and the switch 25 may be dispensed with. In this case, if the special ink paper cassette is loaded into the printer mechanism, the switch 18 is not depressed, so that the detection as to where the cassette has been loaded in the printer mechanism is not performed. Thus, the printer mechanism will not start the printing operation. In other words, only in the case where the standard ink paper cassette is set in the printer mechanism, the switch 18 is depressed so that the printing operation is started. Thus, the printer will not malfunction. Also, in the printer that may use both cassettes, the switch 18 is used for discriminating between a regular and special kind of the cassette 1, and the switch 25 is used for detecting the insertion of the cassette 1.

FIGS. 7A and 7B show the actual operation of the switches shown in FIG. 5. FIG. 7A shows the relationship between the switch 18 and the standard ink paper cassette 1. In FIG. 7A, the rear face connecting portion 16 depresses the switch 18 upon the insertion of the standard ink paper cassette 1, so that the insertion of the cassette 1 is detected as shown in FIG. 7C. FIG. 7B shows the relationship between the switch 18 and the rear face connecting portion 16 when non-standard ink paper cassette 1 is loaded. In this case, when the cassette 1 is loaded, the switch 18 is not depressed due to the provision of the indicating hole 17 formed in the rear faces connecting portion 16. As shown in FIG. 7C, the loading of the cassette 1 is not detected. Thus, the printing operation will not occur. In a more sophisticated printer, there are two switches as shown in FIG. 6A, for detection of the kind of cassette, that is, the regular (standard ink paper) cassette and the irregular (non-standard ink paper) cassette to perform the printing operational mode suitable of the characteristics for the responsive ink paper. In FIG. 7C, a sign o means that the printer is operable, and a sign x means that it is not operable.

FIGS. 8A and 8B show an embodiment in which a depthwise projection 30 is provided in the rear face connecting portion 16 instead of the indicating hole, so that the kind of the cassette is detected according to the projection 30. FIG. 8A shows the relationship between the switch 18 and the loaded standard ink paper cassette 1. In FIG. 8A, if the cassette is set in the printer mechanism, the projection 30 depresses the switch 18 so that the insertion of the cassette 1 is detected as shown in the chart of FIG. 8C. FIG. 8B show the relationship between the switch 18 and the loaded non-standard ink paper cassette 1. In FIG. 8B, even if the cassette 1 is inserted, since the projection 30 is not formed in the rear face connecting portion 16, the switch 18 is not depressed. In this case, as shown in the chart of FIG. 8C, the loading of the cassette 1 is not detected. Therefore, the printing operation will not occur. In case of a high sophisicated printer, the two switches are provided as shown in FIG. 6A, to distinguished the standard non-standard and paper cassettes from each other to perform the suitable printing operation for the characteristics of the respective ink paper.

FIG. 9A and 9B show another embodiment in which a widthwise projection 30 is formed in the rear face connecting portion 16. In this embodiment, the projection 30 extends from the rear face connecting portion 16 toward the switch 18. FIG. 9A shows the relationship between the switch 18 and the standard ink paper cassette 1. In FIG. 9A, if the cassette 1 is set in the printer mechanism, the projection 30 depresses the switch 18. The depression of the switch 18 leads to the detection that the cassette 1 is inserted into the printer mechanism. FIG. 9B shows the relationship between the switch 18 and the non-standard ink paper cassette 1 when loaded. In FIG. 9B, even if the cassette 1 is set in the printer mechanism, the switch 18 is not depressed since the projection 30 is not formed in the rear face connecting portion 16. Accordingly, the detection of the cassette inserted into the printer mechanism is not performed. The printing operation will not occur.

In case of the printer in which not only the standard but also non-standard ink paper may be used, the switch 18 is used as the cassette loading detecting switch. Thus, the printing operation suitable for the characteristics of the respective ink paper will be performed.

Figure 10:
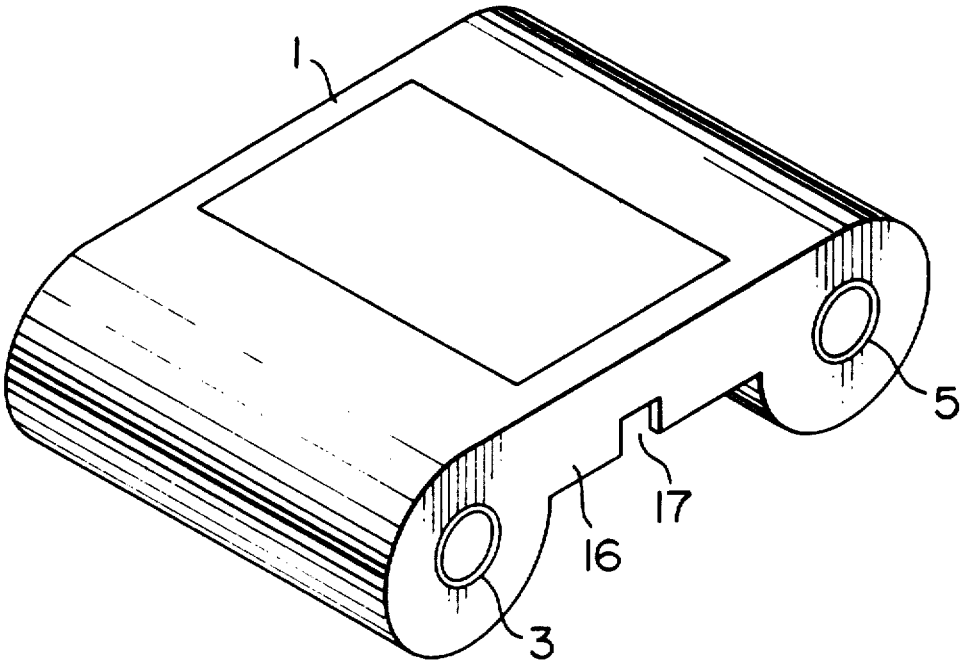
FIGS. 10 to 15 are views showing other examples of an ink paper kind indicating hole according to the present invention.

FIG. 10 shows another type of indicating hole 17 formed in the cassette 1. In FIG. 10, a cutaway or recess 17 is formed as the indicating hole in the lower portion of the rear face connecting portion of the cassette. This recess 17 may be formed in the upper portion of the rear face connecting portion 16 or in the front face connecting portion 15. The operation of the switches or the like in the case where the cassette in accordance with this embodiment is inserted into the printer mechanism is substantially the same as that of the embodiments shown in FIGS. 1 through 8C.

Figure 11:
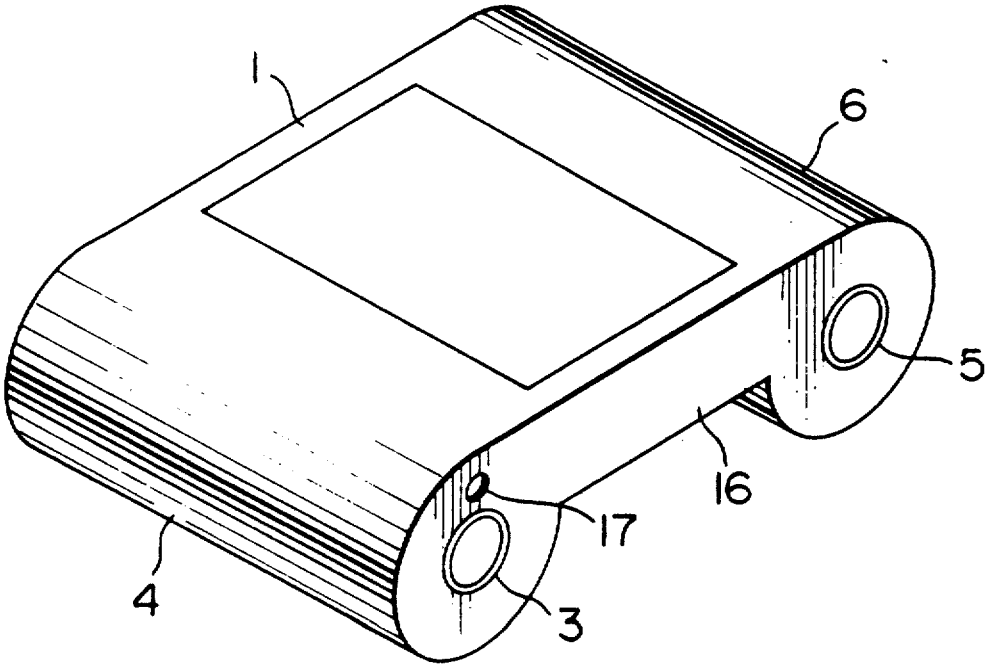

FIG. 11 shows still another type of indicating hole 17 which is formed in the shaft receiving portion 4 of the cassette 1.

Figure 12:
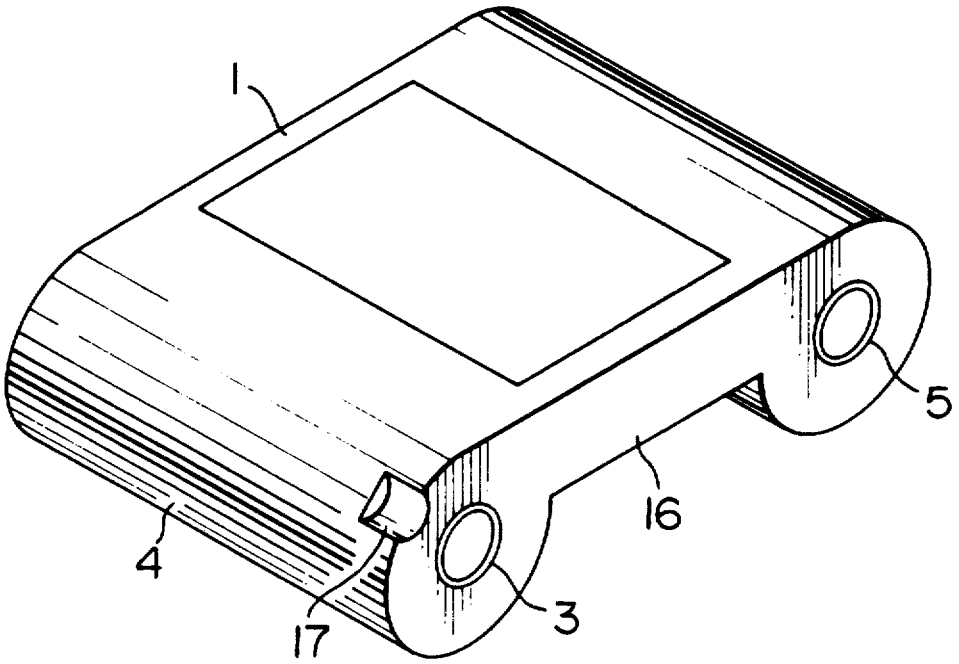

FIG. 12 shows still indicating cutaway portion 17 which is formed in a rear end surface of the shaft receiving portion 4 of the cassette 1.

Figure 13:
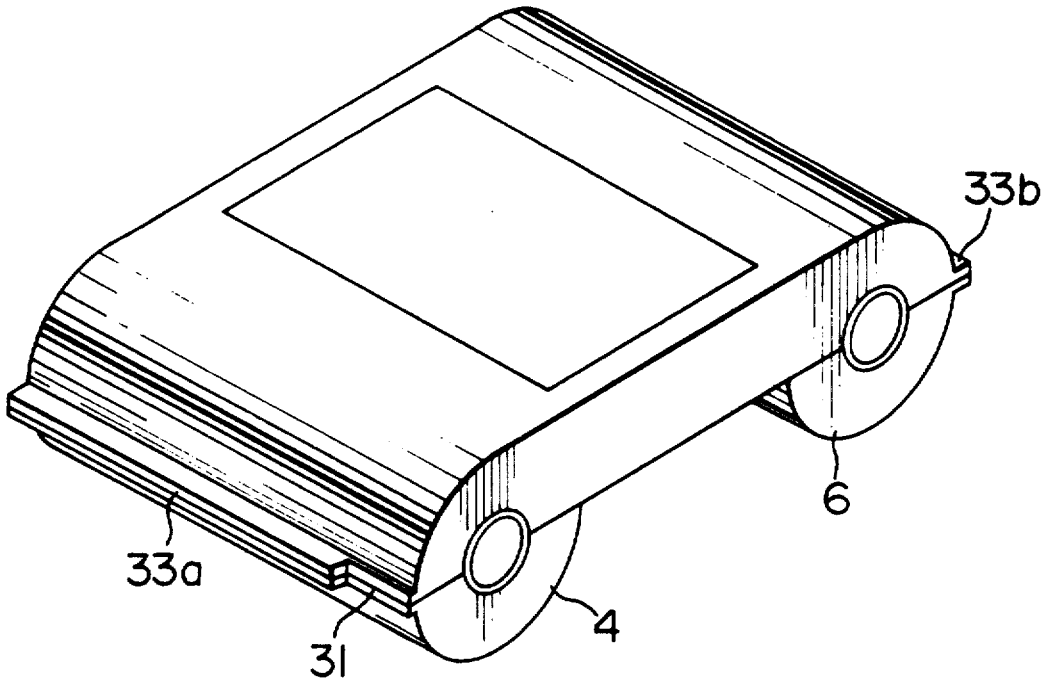

FIG. 13 shows still another indicating arrangement formed in the cassette 1. A cutaway 31 is formed at one rear end of junctions 33a and 33b between the cassette halves which are coupled together. In this case, it is possible to detect the kind of the cassette 1 in accordance with whether or not the cutaway 31 is provided in junctions 33a and 33b.

In the embodiments shown in FIGS. 11 to 13, the operation of the switch or the like in case where the cassette is inserted into the printer mechanism is substantially the same as that of the embodiments shown in FIGS. 1 through 8.

Figure 14:
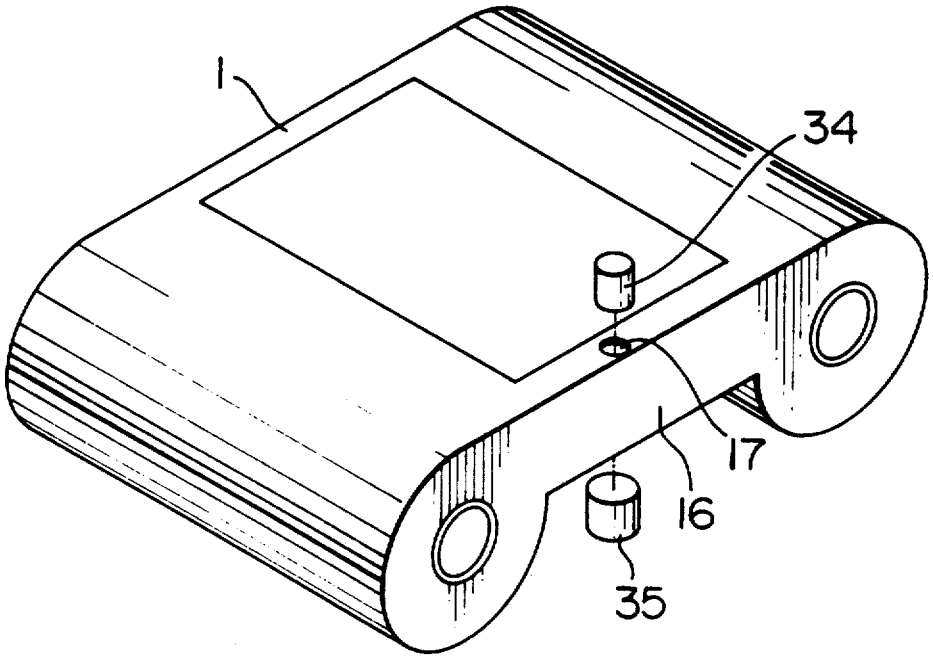

FIG. 14 shows an embodiment in which the detection of the indicating hole 17 is optically carried out. The indicating hole 17 is formed in the top surface of the cassette 1. The detection of the indicating hole 17 is performed by a light source 34 and an optical sensor 35 provided in alignment in the vertical direction. In this case, the indicating hole 17 may be modified as a cutaway portion of the type shown in FIG. 10.

Figure 15:
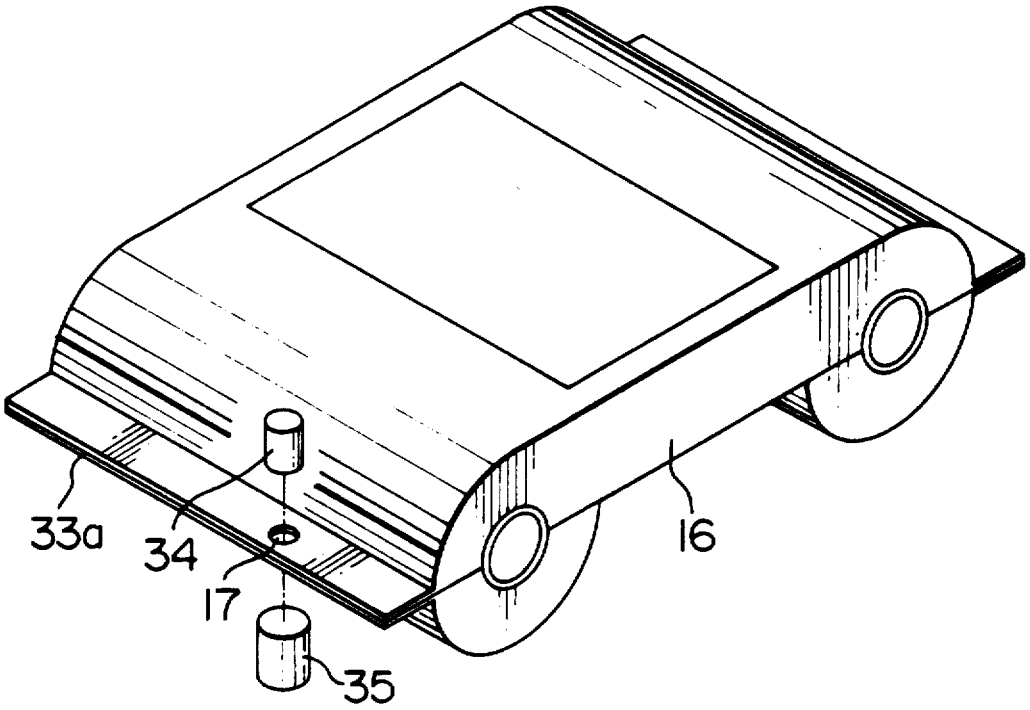

FIG. 15 shows another optical readout means for the indicating hole 17. The kind indicating hole 17 is formed in a junction 33a of the cassette 1, and the detection of the kind indicating hole 17 is performed by a light source 34 and an optical sensor 35 provided in alignment in the vertical direction. In this case, the kind indicating hole 17 may be formed as a cutaway portion of the type shown in FIG. 10.

FIG. 16 shows operations of the two switches 18 and 25 (shown in FIG. 6A) in the printers in which three kinds of ink paper, that is, regular or standard ink paper A and B and non-standard ink paper C is used. As shown in the lower port of the table of FIG. 16 in the ordinary printer, the standard ink paper A and B may be used and in the high sophistication printer, any kind of ink paper may be used. In this case, as described in conjunction with FIG. 6A, only the switch 18 is used as the insertion detecting switch in the ordinary printer, whereas two switches 18 and 25 are provided in the more sophisticated printer. Either switch 18 or 25 can function as the cassette insertion detecting switch and the ink paper discriminating switch. In case of the standard ink paper A cassette, both the switches 18 and 25 are depressed, and in both the ordinary printer and the more sophisticated printer, the insertion of the standard ink paper. A cassette is detected. In case of the standard ink paper B cassette, the switch 18 is depressed, whereas the switch 25 is not depressed. Therefore, in the higher sophistication printer, it is possible to distinguish the cassettes of standard ink paper A and B. However, in the ordinary printer, this discrimination is not carried out. In this case, in the ordinary printer, the printing mode corresponding to the respective ink paper may be set manually by adjusting a contrast adjustment knob on the printer, for example. In the case of the non-standard ink paper C cassette, the switch 18 is not depressed, and in the ordinary printer, the presence of the cassette 1 is not detected. Therefore, it is possible to prevent the non-standard ink paper from being used in the ordinary printer. In the more sophisticated printer, the switch 25 is depressed so that the non-standard ink paper C cassette is detected. The printing mode is changed in accordance with the charcteristics of the ink paper, to perform the printing.

Figure 17A:
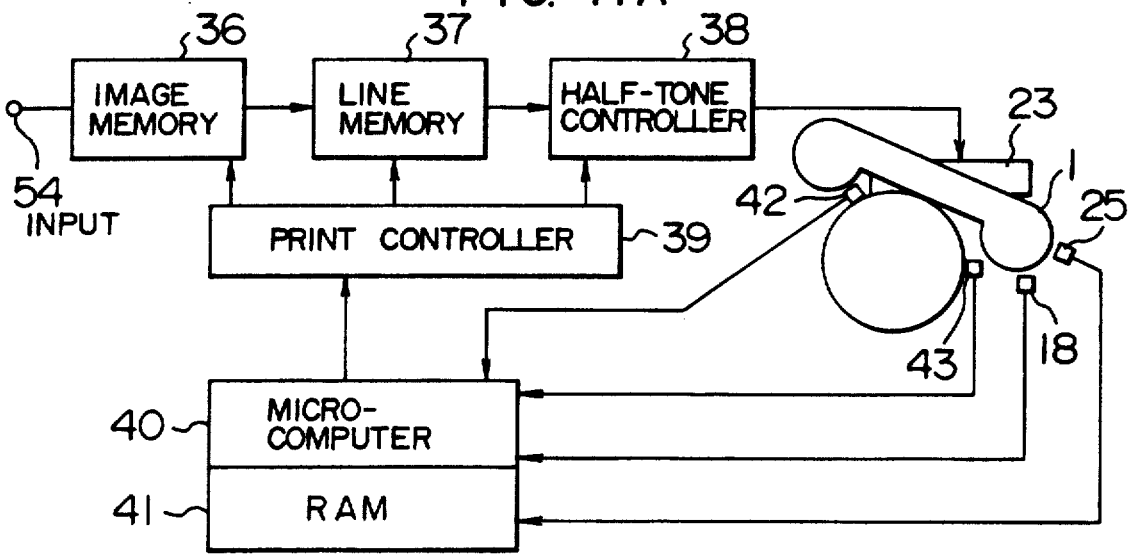
FIGS. 17A and 17B are a diagram and a flowchart, respectively showing an example of the system operation of the thermal transfer recording apparatus.
Figure 17B:
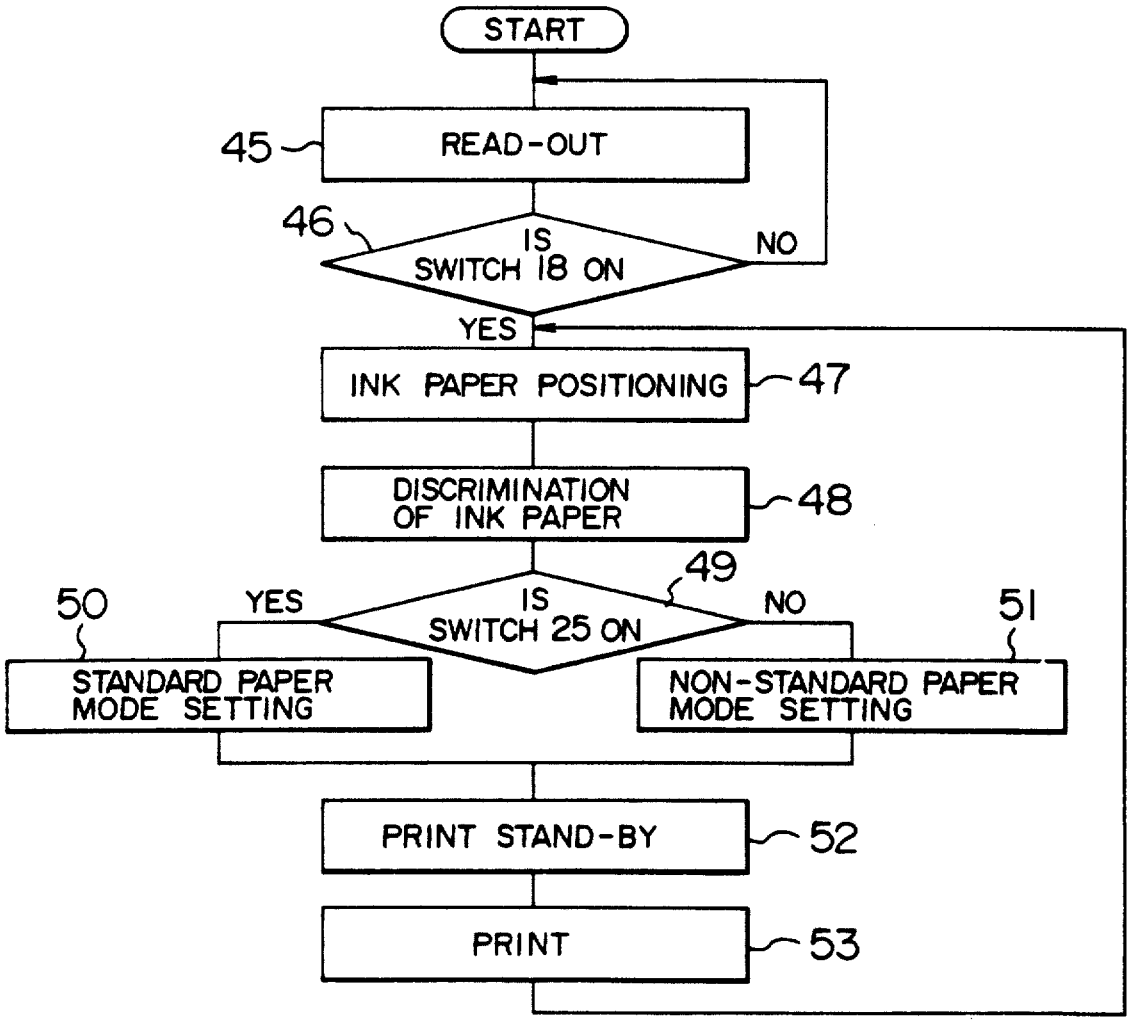

FIGS. 17A and 17B show the system operation of the thermal transfer recording apparatus. FIG. 17A is a flowchart of the thermal transfer recording apparatus. In FIG. 17A, an image data from an input 54 is stored as a static image in an image memory 36. During the printing operation, under the control of a print controller 39, the content stored in the image memory 36 is applied to a line memory 37 for each line successively. A half-tone controller 38 converts each image element data to data for current supply period of the thermal head 23 on the basis of the data of the line memory 37, and generates a strobe signal for driving the thermal head 23. The thermal head 23 generates heat in accordance with the strobe signal waveform to transfer the ink on the ink paper onto the transfer paper. In this case, if the current supply period for the thermal head 23 is long, the quantity of heat generated by the thermal head 23 is large so that a large amount of ink is transferred to the transfer paper to increase the density of the printed image. Also, if the current supply period is short, the quantity of heat generated by the thermal head 23 is small so that a small amount of ink is transferred to the transfer paper to decrease the density of the printed image. In the mechanism 2, there are provided an ink paper position sensor 42, a transfer paper position sensor 43, the cassette loading detection switch 18 and the paper kind discriminating switch 25. The signals therefrom are fed to a microcomputer 40 to control the system. In FIG. 17B, there is shown an example of flowchart of the microcomputer 40. The operation of the system will be described hereinunder with reference to the flowchart in FIG. 17A. At first, the thermal transfer recording apparatus performs a readout (step 45) for detecting the loading of the cassette after the start of the operation. Subsequently, in a step 46, if the cassette is loaded into the apparatus, the next operation is performed, whereas if the cassette is not loaded thereinto, the step 45 is again performed. After the cassette has been loaded, in case of the ordinary printer, the process proceeds to a print stand-by step 52 later described. In case of the more sophisticated printer, the process proceeds to the step 48 for discriminating the kind of ink paper. In accordance with this result, a standard paper mode setting (step 50) or a non-standard paper mode setting (step 51) is carried out. More specifically, the setting of the current supply period for the thermal head, the correction of the color balance and the like are performed in response to the characteristics such as sensitivity of the ink paper and tone. Thereafter, the process proceeds to the print stand-by step 52. Then, the print step is performed in accordance with the command made by the user (step 53). Thereafter, the process is returned back to the ink paper positioning step 47 to repeat the same operations.

What is claimed is:

1. A thermal transfer recording apparatus comprising a printer mechanism, and an ink paper cassette having ink paper made of a strip film on which ink is applied, a supply shaft on which said ink paper is wound and a take-up shaft juxtaposed with said supply shaft for winding said ink paper, said printer mechanism including:

(1) a front face for preventing said printer mechanism from being accessible from the outside, said front face having a loading aperture through which said ink paper cassette is loadable into said printer mechanism in a direction parallel to axes of said take-up and supply shafts;

(2) torque transmission means for transmitting torque to said take-up and said supply shafts;

(3) a drum on which a transfer paper is to be wound, said drum forwarding said transfer paper successively in accordance with image print; and (4) a thermal head receiving a signal corresponding to a pictorial image to be printed, bringing the ink paper in said ink paper cassette into contact with said transfer paper wound on said drum, and generating heat in accordance with said signal to thermally transfer the ink on said ink paper to said transfer paper, thereby printing a desired pictorial image onto said transfer paper, and said ink paper cassette including:

(1) a rear connecting portion having a first end portion rotatably supporting one end of said take-up shaft, a second end portion rotatably supporting one end of said supply shaft, and an interconnecting portion connecting said first and second end portions with a predetermined space therebetween, said interconnecting portion disposed asymmetrically with respect to a line extending through said axes of said take-up and supply shafts, a depth of said rear connecting portion being smaller than a dimension of said loading aperture of said printer mechanism, permitting said cassette to be loaded from said rear connecting portion thereof into said printer mechanism; and (2) a front connecting portion juxtaposed with said rear connecting portion, and having a first end portion rotatably supporting the other end of said take-up shaft, a second end portion rotatably supporting the other end of said supply shaft, and an interconnecting portion connecting said first and second end portions with the predetermined space therebetween, said front connecting portion having a depth greater than the dimension of said loading aperture of said printer mechanism, preventing the ink paper cassette from being loaded from said front connecting portion thereof into said printer mechanism.

2. A thermal transfer recording apparatus according to claim 1, wherein said printer mechanism has positioning pin means on said front face thereof, and said ink paper cassette has a positioning hole for receiving said positioning pin means; said positioning hole being provided at a position of the front connecting portion corresponding to said positioning pin means.

3. A thermal transfer recording apparatus according to claim 1, wherein said ink paper cassette has an indicating hole corresponding to a particular type of ink paper loaded in said ink paper cassette, and said printer mechanism has detector means for detecting the presence or absence of said indicating hole.

4. A thermal transfer recording apparatus according to claim 3, wherein said indicating hole is formed in said rear connecting portion of said ink paper cassette, and said detector means includes a switch provided at a position corresponding to said indicating hole.

5. A thermal transfer recording apparatus according to claim 2, wherein said ink paper cassette has an indicating hole corresponding to a type of ink paper loaded in said ink paper cassette, and said printer mechanism has a detector means for detecting the presence or absence of said indicating hole.

6. A thermal transfer recording apparatus according to claim 5, wherein said indicating hole is formed in said rear connecting portion of the ink paper cassette, and said detector means includes a switch provided at a position corresponding to said indicating hole.

7. A thermal transfer recording apparatus according to claim 1, wherein said ink paper cassette has a projection corresponding to a type of ink paper loaded in said ink paper cassette, and said printer mechanism has a detector means for detecting the presence or absence of the projection at a position corresponding to said projection.

8. A thermal transfer recording apparatus according to claim 1, wherein said ink paper cassette is provided with a cutaway corresponding to a type of ink paper loaded in said ink paper cassette, and said printer mechanism is provided with a detector means for detecting the presence or absence of said cutaway at a position corresponding to said cutaway in the printer mechanism.

9. A thermal transfer recording apparatus according to claim 2, wherein said ink paper cassette has a projection corresponding to a type of ink paper loaded in said ink paper cassette, and said printer mechanism has a detector means for detecting the presence or absence of said projection at a position corresponding to said projection.

10. The thermal transfer recording apparatus according to claim 2, wherein said ink paper cassette is provided with a cutaway corresponding to a type of the ink paper loaded in said ink paper cassette, and said printer mechanism is provided with a detector means for detecting the presence or absence of said cutaway at a position corresponding to said cutaway in said printer mechanism.

11. A ink paper cassette comprising:

ink paper made of a strip film on which ink is applied;

a supply shaft on which said ink paper is wound for supplying the ink paper;

a take-up shaft juxtaposed with said supply shaft for winding said ink paper;

a rear connecting portion having a first end portion rotatably supporting one end of the said take-up shaft, a second end portion rotatably supporting one end of said supply shaft, and an interconnecting portion connecting said first and second end portions with a predetermined space therebetween, said interconnecting portion disposed asymmetrically with respect to a line extending through [said] axes of said take-up and supply shafts; and a front connecting portion juxtaposed with said rear [face] connecting portion and having a first end portion rotatably supporting the other end of said take-up shaft, a second end portion rotatably supporting the other end of said supply shaft, and an interconnecting portion connecting said first and second end portions with the predetermined space therebetween, said front connecting portion having a depth greater than that of said rear connecting portion. [second ends of said supply shaft and said take-*up shaft, said front connecting portion having a depth greater than that of said rear connecting portion.*]

12. An ink paper cassette according to claim 11, wherein a positioning hole is formed in the front connecting portion of said ink paper cassette.

13. An ink paper cassette according to claim 11, wherein an indicating hole corresponding to a type of ink paper loaded in the ink paper cassette is formed in said ink paper cassette.

* * * * *